A. J. DREMEL.
ARTIFICIAL FISH BAIT.
APPLICATION FILED MAY 25, 1911.

1,017,088.

Patented Feb. 13, 1912.

WITNESSES:
O. R. Erwin.
J. D. Cremer.

INVENTOR
Albert J. Dremel
By Emrie & Wheeler
ATTYS.

UNITED STATES PATENT OFFICE.

ALBERT J. DREMEL, OF MILWAUKEE, WISCONSIN.

ARTIFICIAL FISH-BAIT.

1,017,088.  Specification of Letters Patent.  Patented Feb. 13, 1912.

Application filed May 25, 1911. Serial No. 629,258.

*To all whom it may concern:*

Be it known that I, ALBERT J. DREMEL, a citizen of the United States, residing at Milwaukee, county of Milwaukee, and State of Wisconsin, have invented new and useful Improvements in Artificial Fish-Bait, of which the following is a specification.

My invention relates to improvements in that class of artificial fish bait which resembles in appearance a minnow or other small fish, and the same is provided at its respective ends with an ordinary fish hook, which hooks are normally concealed from view within the interior of the bait, but are adapted, as soon as the bait is grasped by a fish, to be instantly released and thrown forwardly by the resilient action of a spring, independently of the action of the fisherman, into the mouth of the fish in such a manner that it becomes impossible for the hook to become accidentally disengaged without catching the fish.

My invention is further explained by reference to the accompanying drawings, in which—

Figure 1:
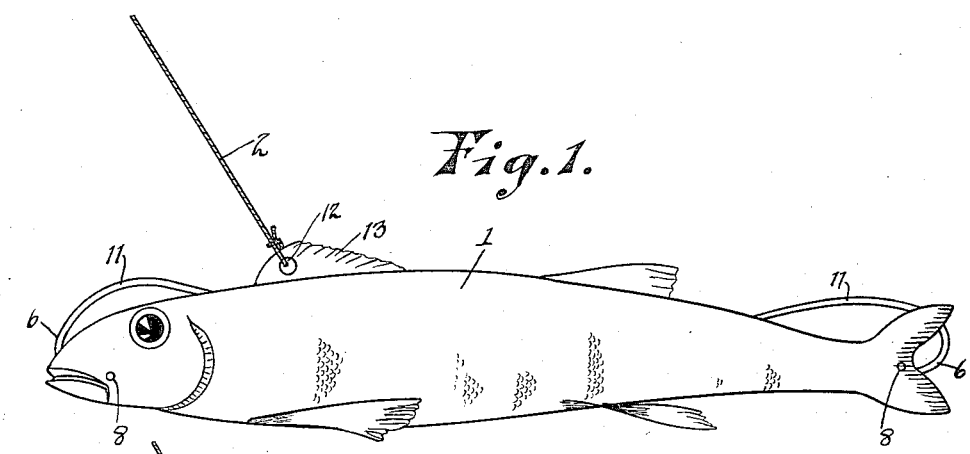
Figure 2:
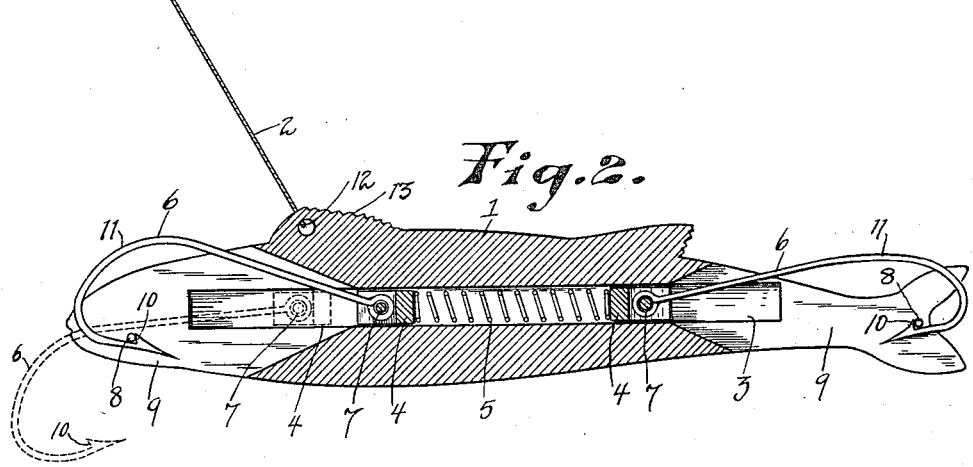
Figure 3:
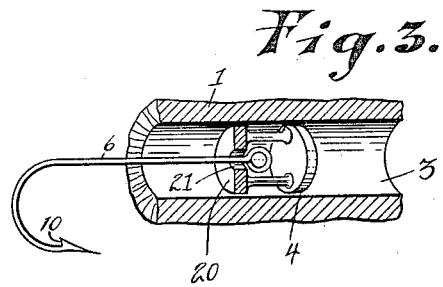

Figure 1 represents a side view of the bait. Fig. 2 represents a longitudinal vertical section of the bait shown in Fig. 1, and Fig. 3 is a modified form of sliding block.

Like parts are identified by the same reference numerals throughout both views.

1 represents the bait proper which is preferably formed to represent a small fish, as stated.

2 is a fish line by which the bait is suspended in the water.

The bait is provided at its center with a longitudinal chamber 3 for the reception of the sliding blocks 4, 4, spiral spring 5, and the inner ends of the respective fish hooks 6, 6, which hooks are connected with said sliding blocks 4 by the transversely arranged pivots 7, 7. The spring 5 is interposed between the respective blocks 4, and is so wound as to normally force said sliding blocks 4 and the respective hooks connected therewith, outwardly as soon as said hooks are released from engagement with the bait. The respective ends of the bait are provided with transversely arranged pins 8, 8, which pins extend across the recesses 9, 9 formed in the respective ends of the bait for the reception of said hooks. The transversely arranged pins are adapted to engage the laterally projecting barb 10 of the respective hooks, whereby they are adapted to normally retain the hooks 6 in the bait against the recoil of the spiral spring 5. The sides 11, 11 of the respective hooks are adapted to project slightly past the upper sides of the bait, whereby as the bait is grasped by the mouth of a fish, said upward bend 11 will be forced inwardly and the barb 10 thereby disengaged from said pins 8, whereby the hook thus disengaged will be thrown forwardly with a quick positive movement by the recoil of said spring 5, into the mouth or throat of the fish. I have preferably connected the line 2 at a distance from either end of the bait, whereby either end of the bait may be grasped by the fish, and it will be understood that said hooks will be released by, and only by, the action of the fish which grasps the bait independently of the strain upon the line 2, whereby the liability of the hooks becoming accidentally disengaged when drawing on the line, is avoided and said hooks can only be disengaged by the fish which is being caught. The line 2 is connected with the bait through the aperture 12 formed in the projecting member 13, which resembles in appearance the fin of a fish.

Attention is called to the fact that by the construction shown, the points of the hooks are both normally retained within the bait, whereby the liability of the same becoming accidentally caught in weeds or other similar substance is avoided.

While I have shown and described the bait provided with a pair of sliding blocks, and the hooks pivotally connected with each of said blocks, I wish it to be understood that if desired, a sliding block and hook may be, in like manner, connected with but one end of the bait only, in which case the end of the spring opposite the sliding block will be provided with a stationary bearing, in other respects, the bait will be constructed substantially as shown and described.

By the modified form shown in Fig. 3, one end of each sliding block is provided with a disk 20, which disk is provided with a central aperture 21 for the reception of a fish hook, whereby such hook may be readily withdrawn by simply passing the barbed end of the hook back and out through said aperture.

Having thus described my invention, what I claim as new and desire to secure by Letters Patent, is—

1. In a device of the described class, the combination of a bait resembling the body of a fish, provided with a longitudinal recess for the reception of a fish hook, and at its center with a longitudinal aperture, a sliding block located in said aperture, a fish hook pivotally connected with said block, a push spring adapted to yieldingly bear against said block, means for normally retaining said hook within said longitudinal recess and a line attached to the side of the bait, said hook being adapted to be actuated by the recoil of said spring independently of the tension on said line.

2. In a device of the described class, the combination of a bait representing the body of a fish, provided at its respective ends with a longitudinal recess, and at its center with a longitudinal aperture, a pair of sliding blocks located in said longitudinal aperture, a fish hook pivotally connected with each of said blocks, a spiral spring interposed between said blocks, and means connected with the respective ends of the fish for normally retaining said hooks in said longitudinal end recess, said spring being adapted, when either of said hooks is disengaged from said retaining means, to throw such hook forwardly out of said end recesses with a quick positive movement.

3. In a device of the described class, the combination of a bait resembling the body of a fish, provided at its respective ends with a longitudinal vertical recess, and at its center with a longitudinal aperture, a pair of sliding blocks located in said central aperture, a spiral spring interposed between said blocks, a fish hook pivotally connected at one end with each of said blocks, while its opposite end is normally retained in said longitudinal recess, a pair of transversely arranged pins located in said longitudinal recess adapted to engage the laterally projecting barb of the hooks and normally retain said hooks within said bait, a fish line, and means for connecting such fish line with said bait at an intermediate point between its respective ends, all substantially as and for the purpose specified.

In testimony whereof I affix my signature in the presence of two witnesses.

ALBERT J. DREMEL.

Witnesses:
JAS B. ERWIN,
I. D. BREMER.

Copies of this patent may be obtained for five cents each, by addressing the "Commissioner of Patents, Washington, D. C."